US008678333B2

(12) United States Patent
Lu et al.

(10) Patent No.: US 8,678,333 B2
(45) Date of Patent: Mar. 25, 2014

(54) MONITOR MOUNTING APPARATUS

(75) Inventors: Der-Wei Lu, New Taipei (TW); Hsien Huei Huang, New Taipei (TW); Kuo-Yuan Chou, New Taipei (TW); Chung-Cheng Hu, New Taipei (TW); Keng-Jui Chang, New Taipei (TW); Chyi-Pyn Peng, New Taipei (TW)

(73) Assignee: Syncmold Enterprise Corp., New Taipei (TW)

( * ) Notice: Subject to any disclaimer, the term of this patent is extended or adjusted under 35 U.S.C. 154(b) by 36 days.

(21) Appl. No.: 13/304,605

(22) Filed: Nov. 25, 2011

(65) Prior Publication Data

US 2013/0037671 A1 Feb. 14, 2013

(30) Foreign Application Priority Data

Aug. 10, 2011 (TW) .............................. 100214807 U

(51) Int. Cl.
*E04G 3/00* (2006.01)
(52) U.S. Cl.
USPC ...................... 248/286.1; 248/284.1; 248/923; 248/371; 361/679.06
(58) Field of Classification Search
USPC ........... 248/286.1, 284.1, 371, 279.1; 16/361; 361/679.06
See application file for complete search history.

(56) References Cited

U.S. PATENT DOCUMENTS

| 4,880,191 | A * | 11/1989 | Lake, Jr. ........................ 248/371 |
| 5,941,493 | A * | 8/1999 | Cheng ............................ 248/371 |
| 6,604,722 | B1 * | 8/2003 | Tan .............................. 248/276.1 |
| 6,966,532 | B2 * | 11/2005 | Ishizaki et al. .............. 248/274.1 |
| 7,537,189 | B2 * | 5/2009 | Jung et al. ................... 248/298.1 |
| 7,731,143 | B2 * | 6/2010 | Muday et al. ............... 248/284.1 |
| 7,798,457 | B2 * | 9/2010 | Chih et al. ................... 248/284.1 |
| 7,987,560 | B2 * | 8/2011 | Wang .............................. 16/367 |
| 2007/0023599 | A1 * | 2/2007 | Fedewa ....................... 248/284.1 |
| 2008/0192417 | A1 * | 8/2008 | Hwang et al. ................. 361/681 |
| 2010/0065694 | A1 * | 3/2010 | Duan et al. ..................... 248/121 |
| 2010/0096516 | A1 * | 4/2010 | Zhou et al. .................. 248/122.1 |

FOREIGN PATENT DOCUMENTS

TW   M367562   10/2009

* cited by examiner

*Primary Examiner* — Terrell McKinnon
*Assistant Examiner* — Daniel J Breslin
(74) *Attorney, Agent, or Firm* — Li & Cai Intellectual Property (USA) Office

(57) ABSTRACT

The instant disclosure relates to a monitor mounting apparatus for using on a working surface. The mounting apparatus includes a base, an adjusting unit, and a tilt bracket. The base is disposed on the working surface and has a first anchoring portion. The adjusting unit includes at least one position-adjusting member and at least one angle-adjusting member pivotally interconnected. The position-adjusting member may be movably arranged on the first anchoring portion of the base. The tilt bracket includes a support plate and a turntable. An outer end portion is defined on the support plate, and the angle-adjusting member is fixed to the support plate away from the outer end portion. The turntable may rotate axially relative to the support plate. The tilt bracket may be tilted between a first operating position and a second operating position as required by a user.

11 Claims, 11 Drawing Sheets

MONITOR MOUNTING APPARATUS

BACKGROUND OF THE INVENTION

1. Field of the Invention

The instant disclosure relates to a mounting apparatus; more particularly, to a mounting apparatus capable of receiving a monitor and adjusting its position.

2. Description of Related Art

Please refer to FIG. 11. A conventional monitor mounting apparatus, the "sliding flip-over type pivot joint and electronic device with the same" of a Taiwan patent of M367562, discloses a pivot joint that comprises a base 10, a sliding block 20, a first elastic member 30, a pivot plate 40, a rotating plate 50, and a second elastic member 60.

The first elastic member 30 is disposed between the base 10 and the sliding block 20 for positioning the sliding block 20 at either end of the base 10. The rotating plate 50 is rotatably arranged on the pivot plate 40. The second elastic member 60 is disposed between the pivot plate 40 and the rotating plate 50 for allowing the rotating plate 50 to rotate with respect to the pivot plate 40 at two defined locations.

Although the abovementioned pivot joint allows the monitor to slide or rotate, the rotation is restricted to two positions only. Therefore, the existing design falls short in providing unrestricted adjustment for the monitor, thus the user's expectation is not met.

SUMMARY OF THE INVENTION

The instant disclosure provides a monitor mounting apparatus. The mounted monitor (e.g., touch screen monitor) may be pivoted and/or rotated to suitable positions for easy access by the user.

An embodiment of the instant disclosure provides a monitor mounting apparatus for use on a working surface that comprises: a base for disposing on the working surface having at least one first anchoring portion; an adjusting unit that includes at least one position-adjusting member and at least one angle-adjusting member, where the position-adjusting member may be movably disposed on the first anchoring portion of the base; and a tilt bracket having a support plate and a turntable, where the support plate has an outer end portion. The angle-adjusting member of the adjusting unit is in connection to a side portion of the support plate away from the outer end portion thereof. The turntable may rotate axially relative to the support plate. The tilt bracket may be movably oriented in between a first operating position and a second operating position. When the tilt bracket is oriented at the first operating position, the distance between the outer end portion and the working surface is less than the distance there between when the tilt bracket is oriented at the second operating position.

A guide slot is preferably formed on the outer end portion of the support plate, allowing the turntable to be movably disposed on the outer end portion.

Preferably, the mounting apparatus further comprises a synchronizing mechanism. The synchronizing mechanism includes a shaft, a toothed rack, and a gear. The shaft penetrates through the turntable, the guide slot of the support plate, and the gear. The shaft is connected between the turntable and the gear, and the toothed rack is fixed on the support plate and intermeshed to the gear.

Preferably, an elongated opening is formed on the first anchoring portion, and the position-adjusting member includes at least one slide pin. The slide pin may be slid ably penetrated through the opening.

The base preferably has a base plate and at least one fixing plate mounted thereon. The first anchoring portion is defined on one end of the fixing plate. Whereas a second anchoring portion is defined on an opposite end of the fixing plate. The angle-adjusting member may be pivotally connected to the first anchoring portion.

The mounting apparatus preferably further includes at least one tilt frame. The tilt frame has a first end portion and second end portion formed oppositely thereon. The first end portion may be pivotally connected to the second anchoring portion of the base, and the second end portion may be pivotally connected to the angle-adjusting member.

A stop is preferably extended from one end portion of the base away from the first anchoring portion. The position-adjusting member of the adjusting unit further has a traverse block. One end of the traverse block is fixed to the position-adjusting member. Whereas an energy-storing device is arranged between the opposite end of the traverse block and the stop. The energy-storing device includes at least one tension spring set. The tension spring set is fixed to the stop and the traverse block on opposite ends thereof.

In some embodiments, a mounting apparatus having a synchronizing mechanism may be provided. The synchronizing mechanism has a traverser, and an arch-shaped guide slot is formed on the support plate. A via hole is formed on the turntable, where the traverser is penetrated through the via hole and may be movably disposed in the guide slot.

The synchronizing mechanism includes a guide frame, a guide block, and a connecting arm. The guide frame is fixed to the support plate, and the guide block may be movably disposed between the guide frame and the support plate. A via-slot is formed on the guide block. The traverser may be movably penetrated through the via-slot of the guide block. The connecting arm is pivotally connected to the base and the guide block on opposite ends thereof.

The guide slot is preferably arch-shaped having a radius being the distance between the center of the turntable and the hole thereon. The arc formed by the guide slot has a central angle of 90°.

An elongated opening is preferably formed on the first anchoring portion, and the position-adjusting member includes at least one slide pin. The slide pin may be slidably penetrated through the opening.

The base preferably has a base plate and at least one fixing plate mounted thereon. The first anchoring portion is defined on one end of the fixing plate. Whereas a second anchoring portion is defined on an opposite end of the fixing plate. The angle-adjusting member may be pivotally connected to the first anchoring portion.

The mounting apparatus preferably further includes at least one tilt frame. The tilt frame has a first end portion and second end portion formed oppositely thereon. The first end portion may be pivotally connected to the second anchoring portion of the base, and the second end portion may be pivotally connected to the angle-adjusting member.

A stop is preferably extended from one end portion of the base away from the first anchoring portion. The position-adjusting member of the adjusting unit further has a traverse block. One end of the traverse block is fixed to the position-adjusting member. Whereas an energy-storing device is arranged between the opposite end of the traverse block and the stop. The energy-storing device includes at least one tension spring set. The tension spring set is fixed to the stop and the traverse block on opposite ends thereof.

Based on the above, the monitor mounting apparatus of the instant disclosure utilizes the position-adjusting and angle-adjusting members of the adjusting unit to adjust the tilt bracket between the first and second operating positions, thereby achieving the capability of adjusting the orientation of the tilt bracket.

DETAILED DESCRIPTION OF EMBODIMENTS

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

First Embodiment

Figure 1:
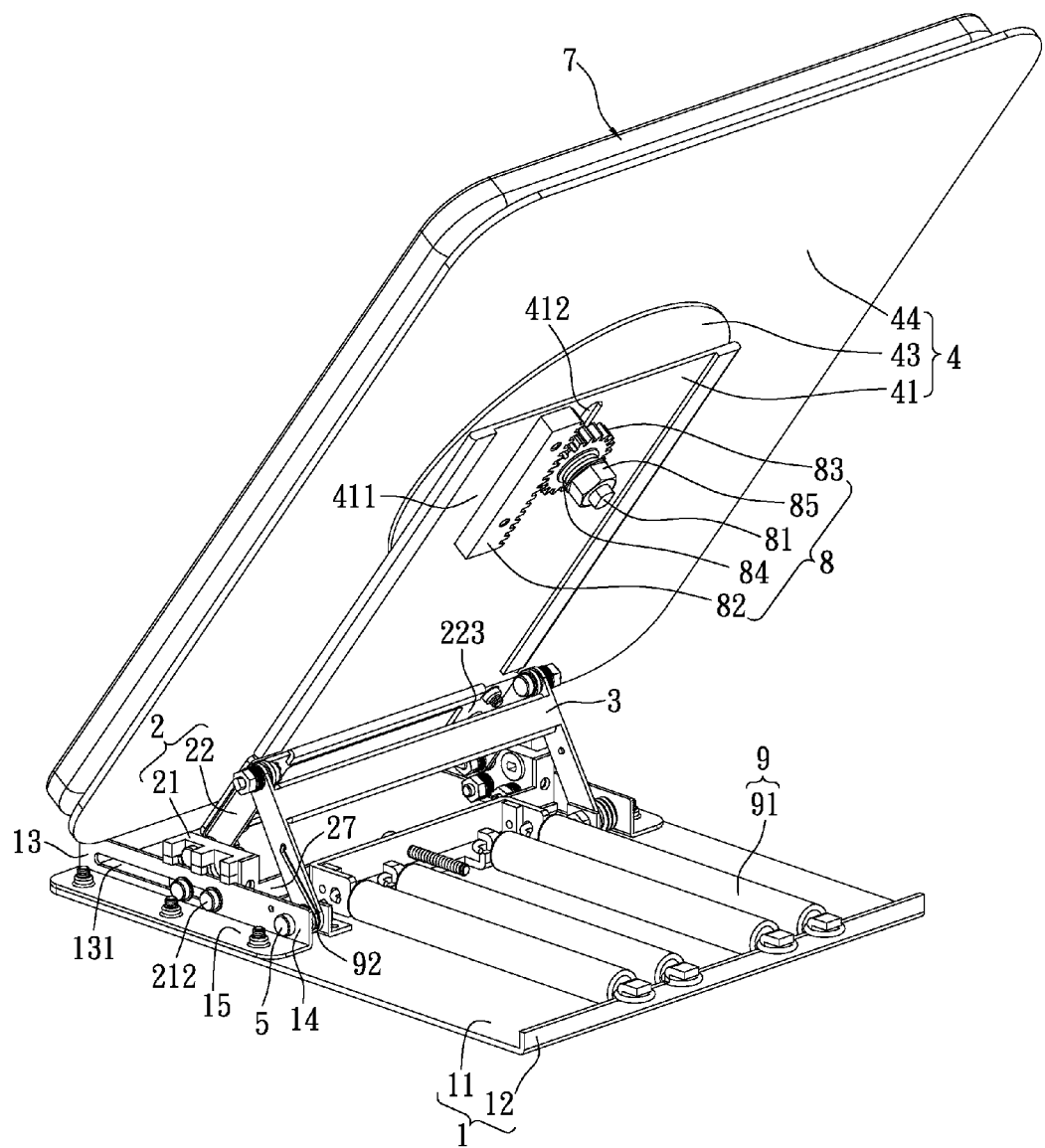
FIG. 1 is a perspective view of a monitor mounting apparatus for a first embodiment of the instant disclosure.

Please refer to FIG. 1, which shows a first embodiment of the monitor mounting apparatus in accordance with the instant disclosure. The mounting apparatus comprises a base 1, an adjusting unit 2, at least one tilt frame 3, a tilt bracket 4, six pivot pins 5, and a synchronizing mechanism 8.

Figure 2:
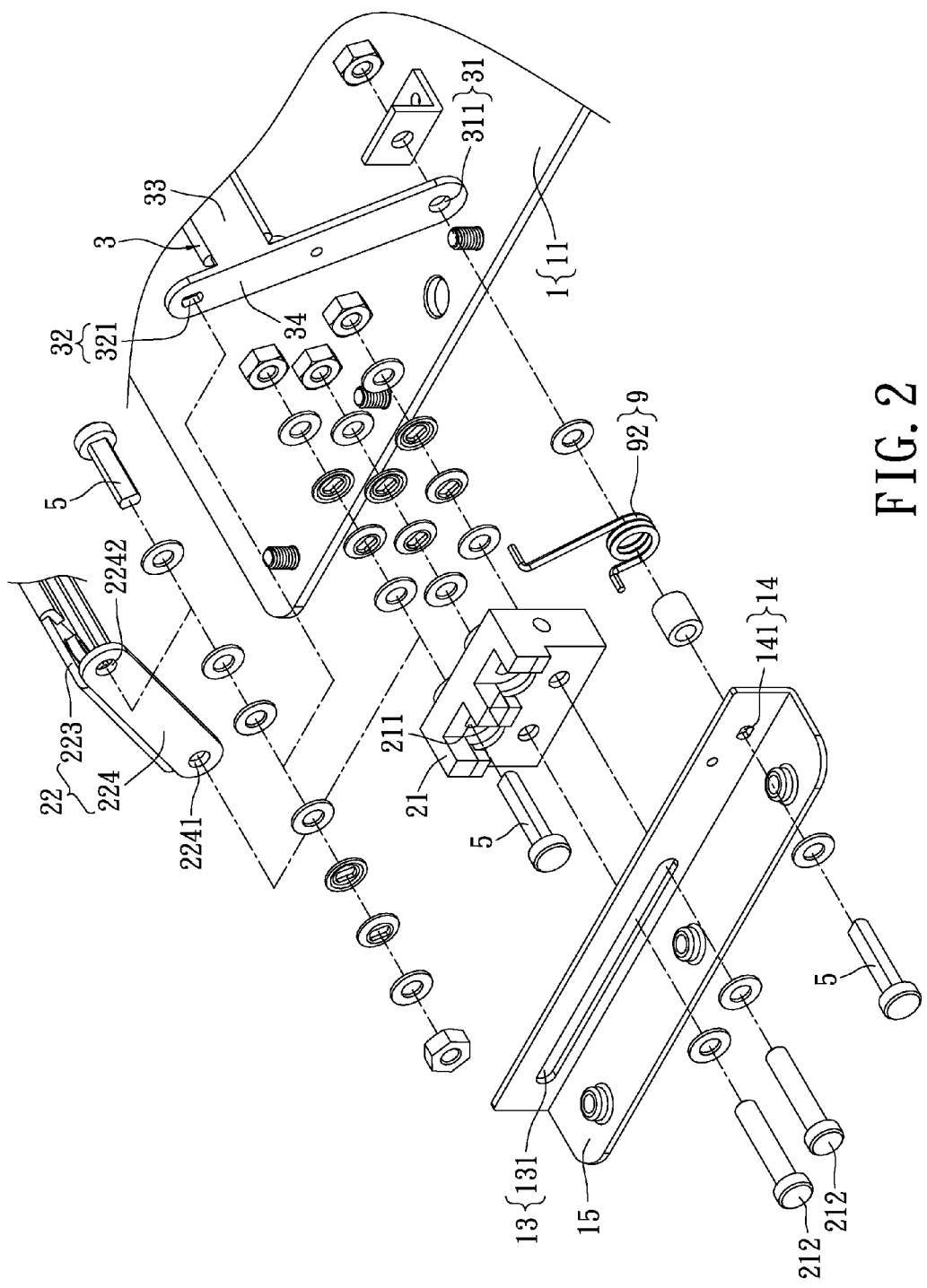
FIG. 2 is a partial exploded view of the monitor mounting apparatus in FIG. 1.

Please refer to FIG. 2 in conjunction with FIG. 1. The base 1 has a flat base plate 11. Two fixing plates 15 each having an L-shaped cross-section are arranged on opposite side portions of the base plate 11. Each fixing plate 15 has a first anchoring portion 13 and a second anchoring portion 14 defined oppositely thereon. The first anchoring portion 13 has an elongated opening 131 formed thereon substantially parallel to the base plate 11. A hole 141 is formed on the second anchoring portion 14.

The adjusting unit 2 includes a pair of position-adjusting members 21 and an angle-adjusting member 22. Each position-adjusting member 21 is of a block-shaped structure and has a hole 211 formed thereon. A pair of slide pins 212 are arranged adjacent to each position-adjusting member 21 and may be movably projected through the opening 131. The angle-adjusting member 22 has a base frame 223 and two sidewalls 224 curvedly extended from opposite end portions thereof Holes 2241, 2242 are formed on opposite end portions of each sidewall 224.

The penetration of each position-adjusting member 21 by the corresponding pivot pin 5 via the hole 211 and the penetration of the hole 2241 of each sidewall 224 of the angle-adjusting member 22 using the same allows the angle-adjusting member 22 to be pivotally connected to the position-adjusting members 21.

The tilt frame 3 has a cross bar 33 and a pair of legs 34 connected oppositely thereto. Namely, the tilt frame 3 is of a substantially H-shaped frame structure. Each leg 34 has a first end portion 31 and a second end portion 32 formed oppositely thereon. A hole 311 and a hole 321 are formed on the first end portion 31 and the second end portion 32, respectively.

Two pivot pins 5 are used to penetrate the respective holes 141 of the second anchoring portions 14 of the base 1 and the respective holes 311 of the first end portions 31 of the tilt frame 3, thus enabling the tilt frame 3 to be pivotally connected to the second anchoring portions 14 of the base 1. Moreover, two more pivot pins 5 are used to penetrate the respective holes 321 of the second end portions 32 of the tilt frame 3 and the respective holes 2242 of the sidewalls 224 of the angle-adjusting member 22, thus enabling the tilt frame 3 to be pivotally connected to the angle-adjusting member 22.

The pivot pins 5 may generally be any rivet, screw, bolt, split pin, spring pin, snap pin, combination of screw and nut or nail and buckle, or other types of suitable fasteners.

Figure 3:
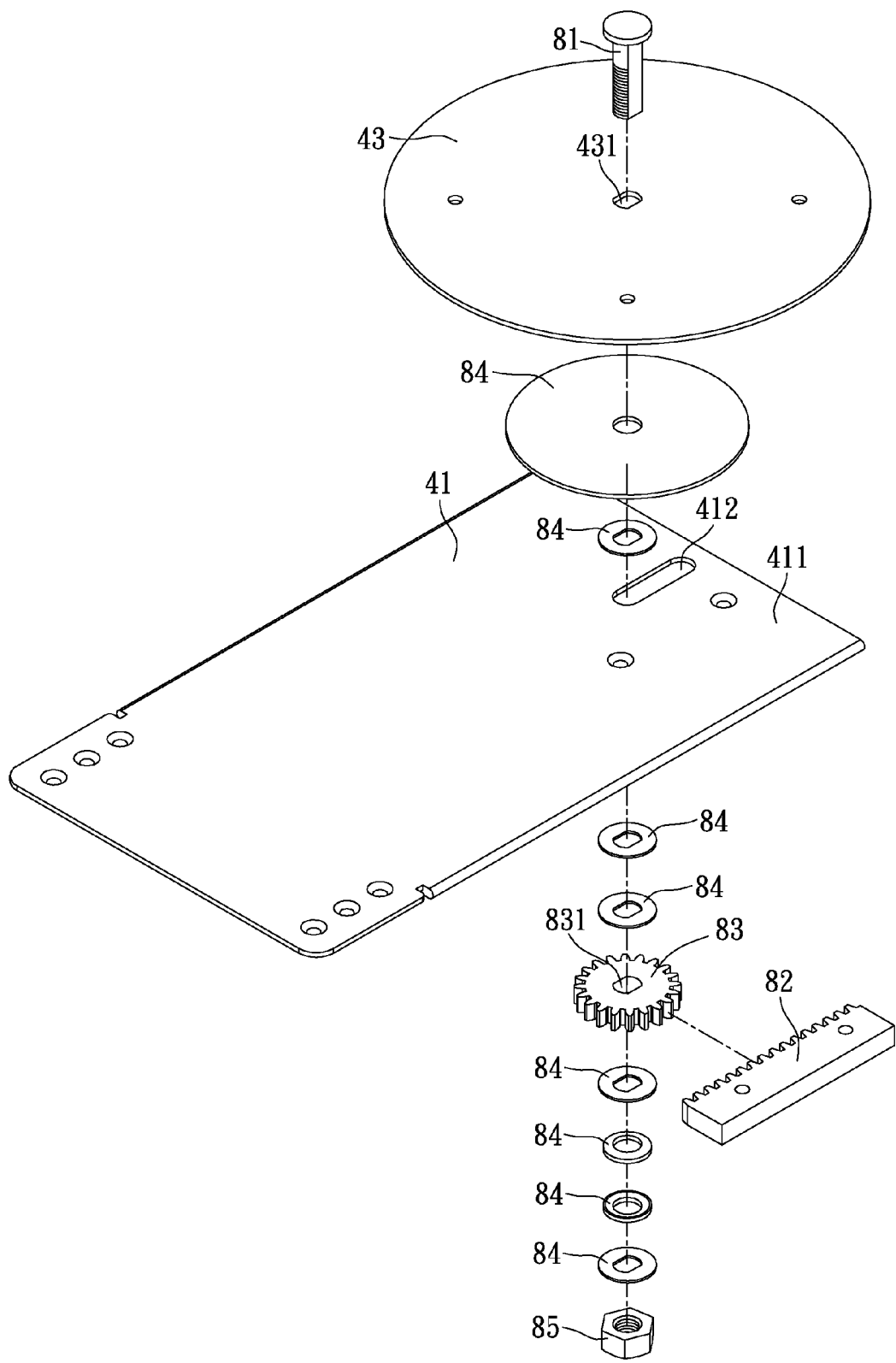
FIG. 3 is another partial exploded view of the monitor mounting apparatus in FIG. 1.

Next, please refer to FIG. 3 in conjunction with FIG. 1. The tilt bracket 4 has a flat support plate 41, a turntable 43, and a display holder 44. One end of the support plate 41 is fixed to the base frame 223 of the angle-adjusting member 22, while the opposite end thereof (i.e., the end of the support plate 41 away from the angle-adjusting member 22, referred herein as an outer end portion 411) is formed with a linear guide slot 412 thereon. A hole 431 is centrally formed on the turntable 43, and the turntable 43 may be movably disposed on the outer end portion 411 of the support plate 41. The turntable 43 and the display holder 44 in particular may rotate axially relative to the support plate 41. A circular hole (not shown) is centrally formed on the display holder 44, where the display holder 44 is fixed to the turntable 43.

The synchronizing mechanism 8 includes a shaft 81, a toothed rack 82, a gear 83, a plurality of washers 84, and a nut 85. A screw, for example, is used as the shaft 81 for the instant embodiment. The shaft 81 in particular has a non-cylindrical body with opposing flat surfaces formed thereon. The toothed rack 82 is arranged on the surface of the outer end portion 411 of the support plate 41 facing away from the turntable 43. A hole 831 is centrally formed on the gear 83, where the shape of the hole 831 matches the shape of the shaft 81. The gear 83 may be intermeshed to the toothed rack 82.

Furthermore, the shape of the hole 431 of the turntable 43 matches the shape of the shaft 81, and the shaft 81 is movably and rotatably penetrated through the guide slot 412. For the fastening sequence, the shaft 81 penetrates the circular hole of the display holder 44, the hole 431 of the turntable 43, the guide slot 412, the hole 831 of the gear 83, and the nut 85. For reducing wear due to friction, at least one washer 84 may be arranged between any two of the abovementioned components during the penetration by the shaft 81.

The display holder 44, the turntable 43, the shaft 81, and the gear 83 work cooperatively in providing synchronized operation. For example, when the user rotates the display holder 44, the turntable 43 along with the shaft 81 and the gear 83 will be actuated synchronously.

Moreover, as the display holder 44 is rotated, the display holder 44 will also be displaced along an imaginary plane defined by itself. Correspondingly, when the display holder 44 is displaced along the imaginary plane described above, a rotational movement will be induced on the display holder 44. Therefore, if acted by the user, the display holder 44 will travel linearly and rotates axially at the same time.

In addition, the pressing force from the nut 85 and the frictional force generated between the toothed rack 82 and the gear 83 allow the display holder 44 (or the combination of the display holder 44 and the supported article) to stop displacing and rotating at any position within a range of adjustment.

Figure 4:
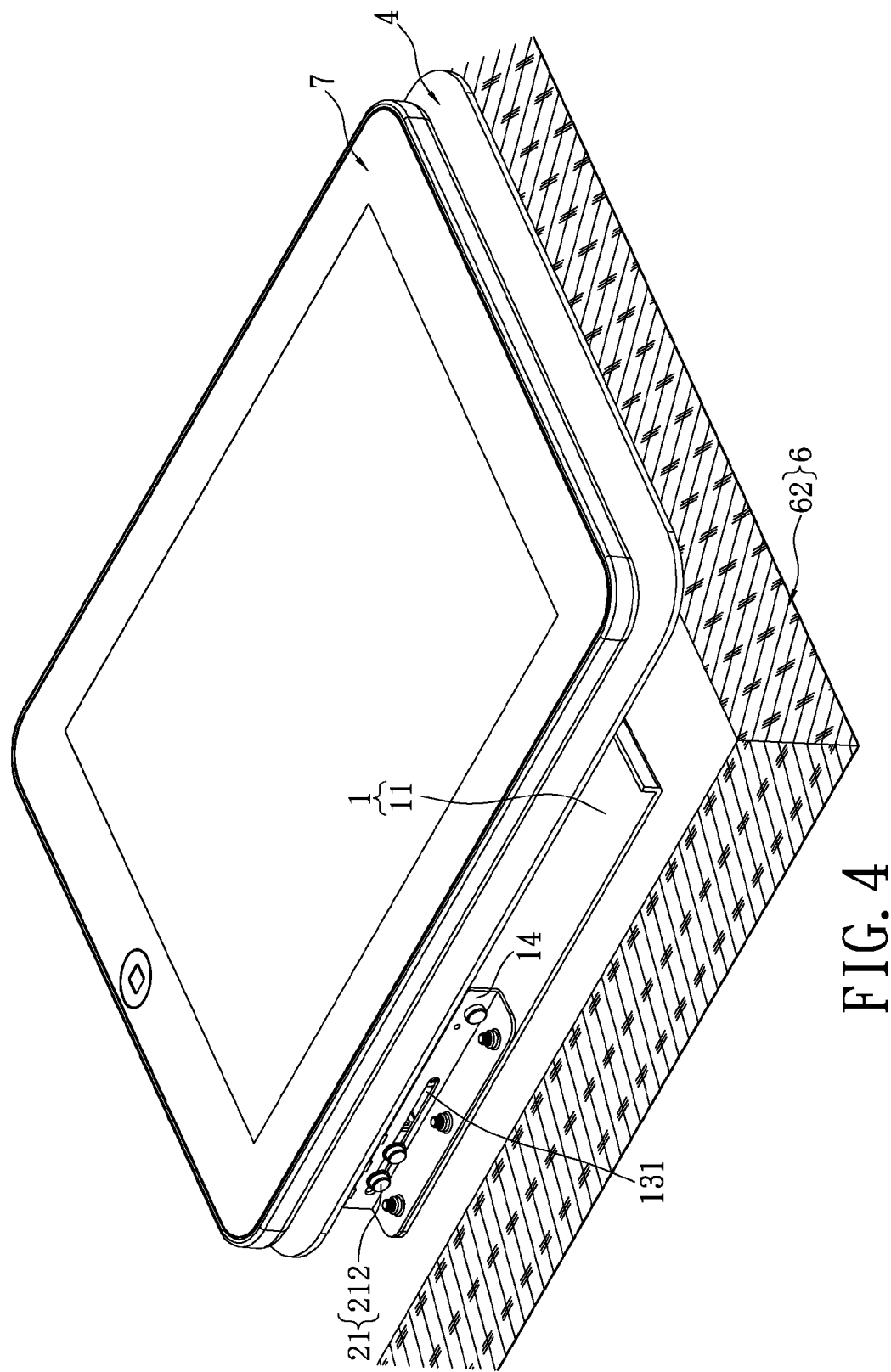
FIG. 4 is a schematic view of the monitor mounting apparatus in FIG. 1 while in use at a horizontal operating position.
Figure 5:
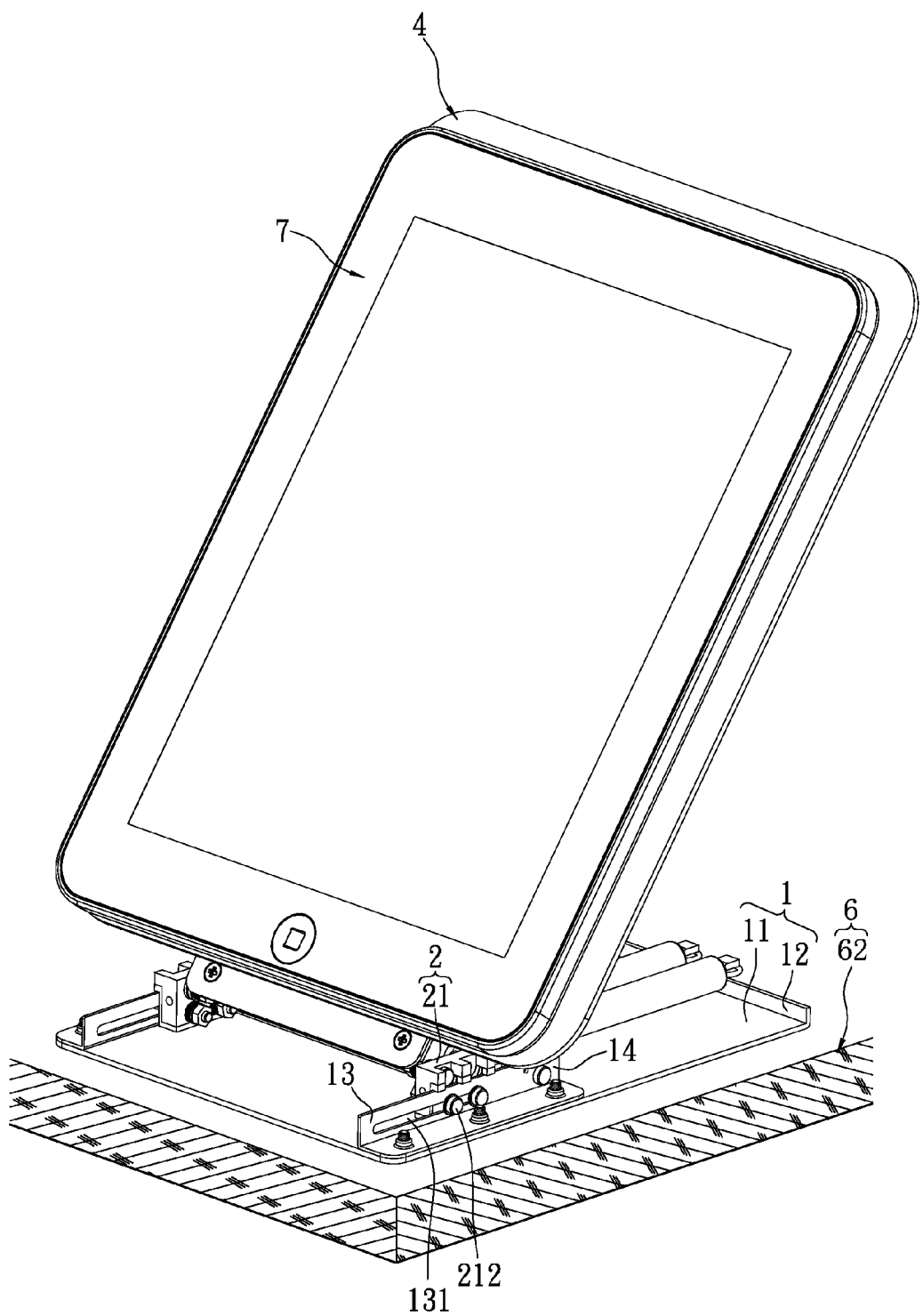
FIG. 5 is a schematic view of the monitor mounting apparatus in FIG. 1 while in use at a maximum angular position relative to the horizontal operating position.

Through the adjusting unit 2, the tilt bracket 4 of the mounting apparatus of the instant disclosure may be adjusted between a first operating position (as indicated in FIG. 4 by the horizontal orientation of the tilt bracket 4) and a second operating position (i.e., the maximum allowable inclined position as shown in FIG. 5), inclusively. The maximum allowable inclined position is defined by the maximum allowable angle between the support plate 41 of the tilt bracket 4 and the base plate 11 of the base 1.

When the tilt bracket 4 is oriented at the horizontal position, the support plate 41 of the tilt bracket 4 and the base plate 11 of the base 1 are substantially parallel to each other. In other words, the angle therebetween is about 0°. Concurrently, the connecting sections between the position-adjusting members 21 and the angle-adjusting member 22 are oriented at a first position. In other words, the slide pins 212 for the position-adjusting members 21 are forced away from the second anchoring portions 14 within the openings 131.

As shown in FIGS. 1 and 5, when the tilt bracket 4 arranged at the maximum allowable inclined position, the maximum allowable angle is formed between the support plate 41 of the tilt bracket 4 and the base plate 11 of the base 1. This maximum angle is 60° for the instant embodiment, however, it is not restricted thereto.

Furthermore, the angle-adjusting member 22 is pivotally connected to the position-adjusting members 21 and the tilt frame 3 on opposite ends thereof. Such configuration enables the tilt bracket 4 to distribute its load (tilt bracket 4 and supported article) in preventing biasing toward the horizontal position. Concurrently, the connection sections between the position-adjusting members 21 and the angle-adjusting member 22 are oriented to a second position. In other words, the slide pins 212 of the position-adjusting members 21 are forced near the second anchoring portions 14 within the opening 131.

Figure 6:
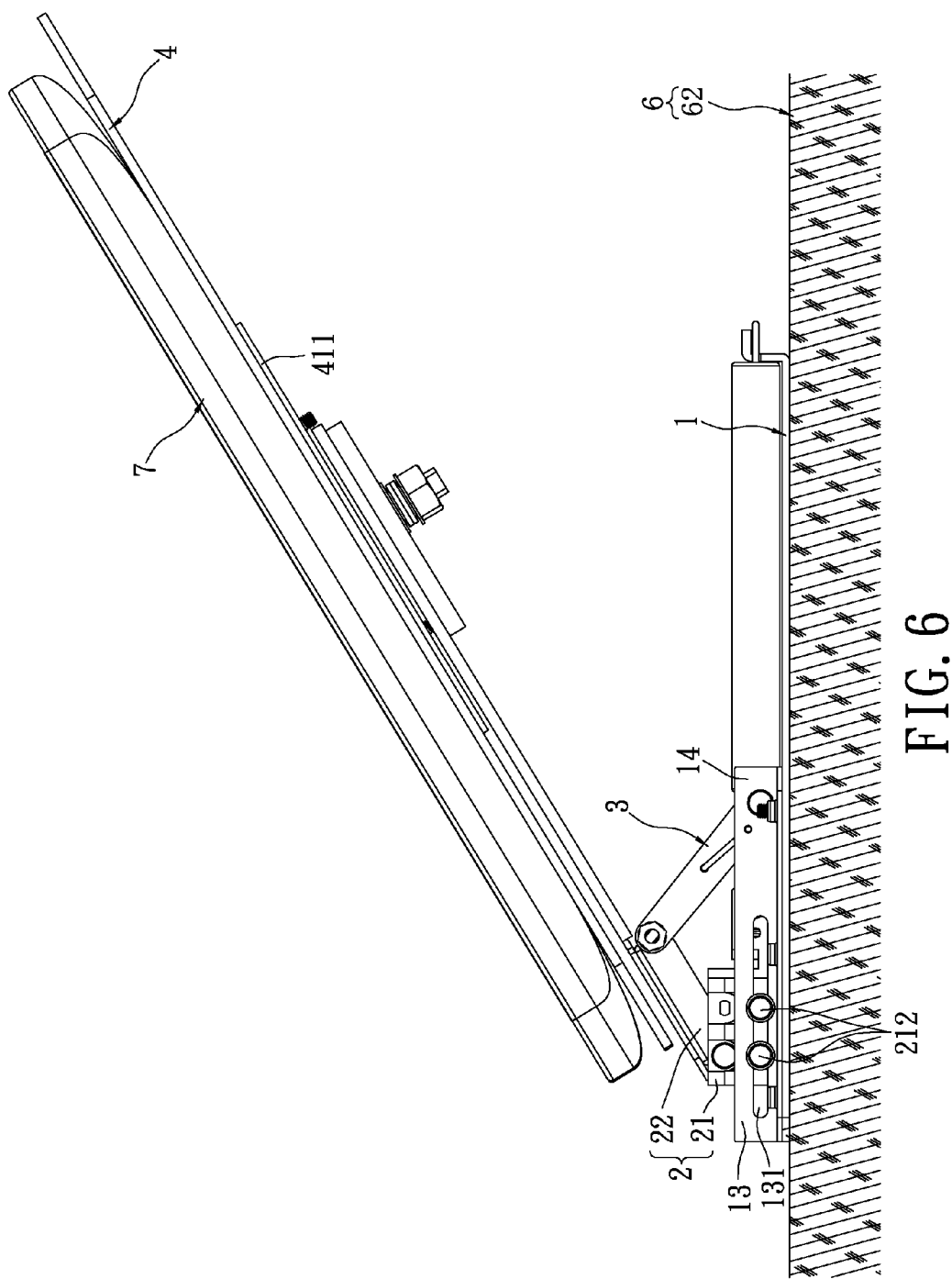
FIG. 6 is a schematic view of the monitor mounting apparatus in FIG. 1 while in use at an intermediate angular position.

In the instant embodiment, the washers 84 and the washer assemblies (not labeled) for the slide pins 212 are provided to create sufficient frictional force in stopping the tilt bracket 4 anywhere within the adjustment range. As shown in FIG. 6, the user is able to adjust and stop the tilt bracket 4 anywhere within the adjustment range defined by the first operating position and the maximum allowable inclined position.

In addition, please refer back to FIG. 1. A wall-like member, herein referred as a stop 12, is formed extendingly from the end portion of the base plate 11 away from the first anchoring portions 13. The position-adjusting members 21 of the adjusting unit 2 are further provided with a traverse block 27. The traverse block 27 is fixed to the position-adjusting members 21 on opposite ends thereof. Whereas an energy-storing device 9 is arranged between the traverse block 27 and the stop 12. For the instant embodiment, the energy-storing device 9 includes four tension spring sets 91 (i.e., tension spring and its housing) and two torsion springs 92.

One end of each tension spring set 91 is fixed to the stop 12, while the other end thereof is fixed to the traverse block 27. Each of the torsion springs 92 is fixed to the tilt frame 3 and the corresponding second anchoring portion 14 on opposite ends thereof.

When the tilt bracket 4 is oriented at the horizontal position, the weight of the tilt bracket 4 (or the weight of the tilt bracket 4 and the supported article) pulls the tension spring sets 91 and the torsion springs 92, thus causing a restoring energy to be respectively stored therein. When a user intends to adjust the tilt bracket 4 from the horizontal position to the maximum allowable inclined position, the restoring energy is released by the energy-storing device 9 at the instant when the tilt bracket 4 is released from the horizontal position. The restoring energy assists the user in adjusting the orientation of the tilt bracket 4. The restoring energy of the energy-storing device 9 and the frictional force generated by the washers 84 and the washer assemblies work cooperatively in allowing the tilt bracket 4 (or tilt bracket 4 and the support article) to be oriented at any intermediate position or the maximum allowable inclined position within the adjustment range.

Please refer back to FIGS. 4-6. In use, the base plate 11 of the base 1 may be disposed on the working surface 6 (e.g., a table surface 62). A monitor 7 is disposed on the tilt bracket 4. Thereby, the monitor 7 may be selectively oriented anywhere within the adjustment range defined by the horizontal position and the maximum allowable inclined position. In practice, the display holder 44 needs to be provided with at least one retainer (e.g., hook) to retain the monitor 7 thereon. Since the retainer is not of main focus for the instant disclosure, no further illustration is provided herein.

Moreover, when the tilt bracket 4 is oriented at the horizontal position, the distance between the outer end portion 411 of the tilt bracket 4 and the table surface 62 is less than the distance therebetween when the tilt bracket 4 is oriented at the maximum allowable inclined position.

For the instant embodiment, the center of mass of the monitor 7 is projected near the central portion of the base plate 11 regardless of the position of the tilt bracket 4. Therefore, the monitor 7 and the mounting apparatus would not tilt over due to imbalance. In addition, the inclination and rotational adjustments of the monitor 7 are independently performed to provide convenience for the user.

Second Embodiment

Figure 7:
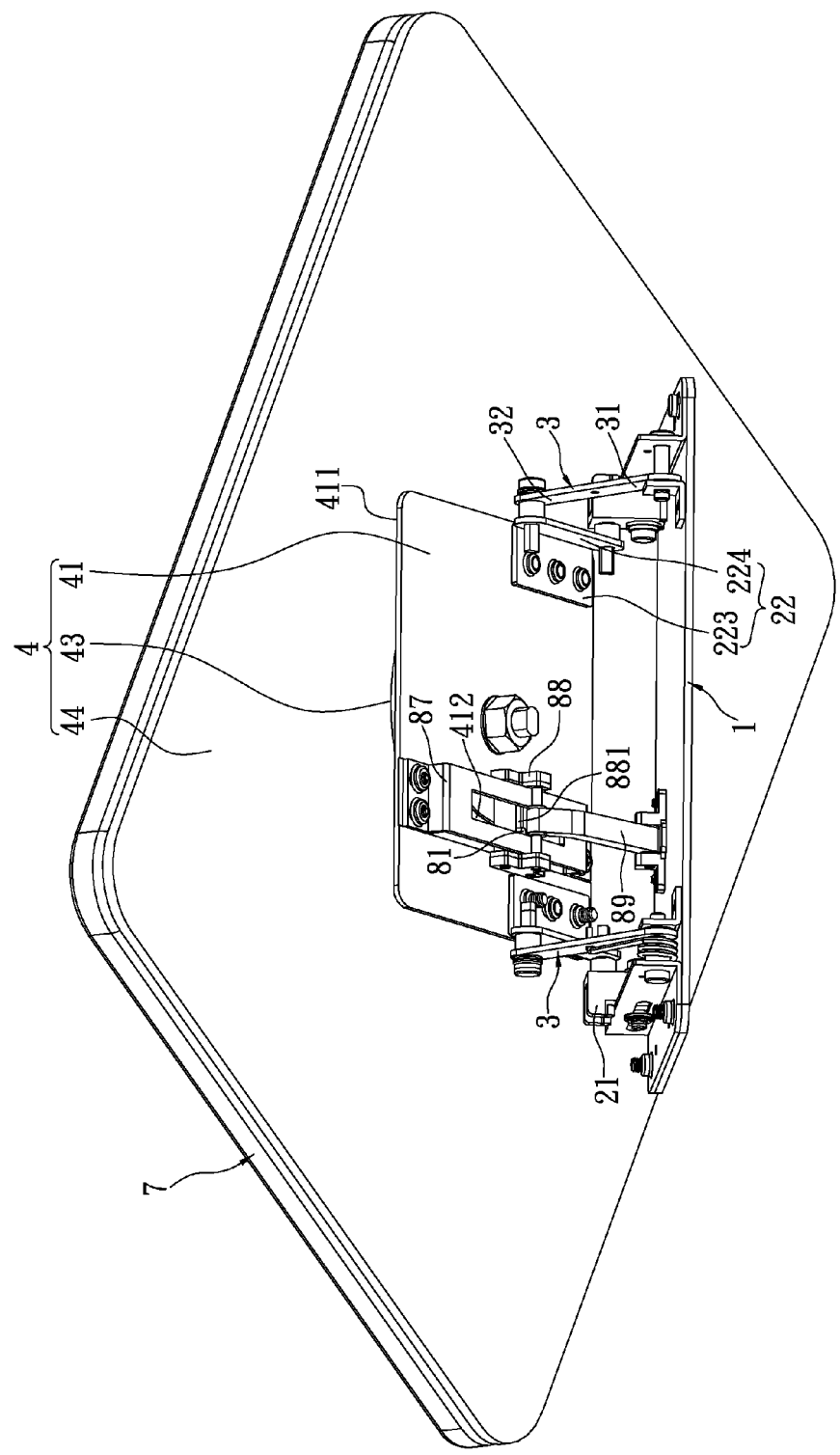
FIG. 7 is a perspective view of a monitor mounting apparatus for a second embodiment of the instant disclosure.

Please refer to FIG. 7, which shows a second embodiment of the monitor mounting apparatus in accordance with the instant disclosure. Comparing to the previous embodiment, the mounting apparatus of the instant embodiment is not provided with the tension spring sets 91. Furthermore, the synchronizing mechanism 8 of the instant embodiment is capable of adjusting the inclination and the rotational movement of the monitor 7 on the tilt bracket 4 simultaneously.

For the instant embodiment, the mounting apparatus comprises a pair of angle-adjusting members 22 and a pair of tilt frames 3. Each angle-adjusting member 22 has a base frame 223 and a sidewall 224 bendingly extended from an edge portion thereof. Each tilt arm 3 has a plate-like shape and a first end portion 31 and a second end portion 32 formed oppositely thereon. The interconnections between the angle-adjusting members 22, the tilt arms 3, the base 1, and the position-adjusting members 21 are substantially similar to the previous embodiment, therefore no further elaboration is given herein.

Figure 8:
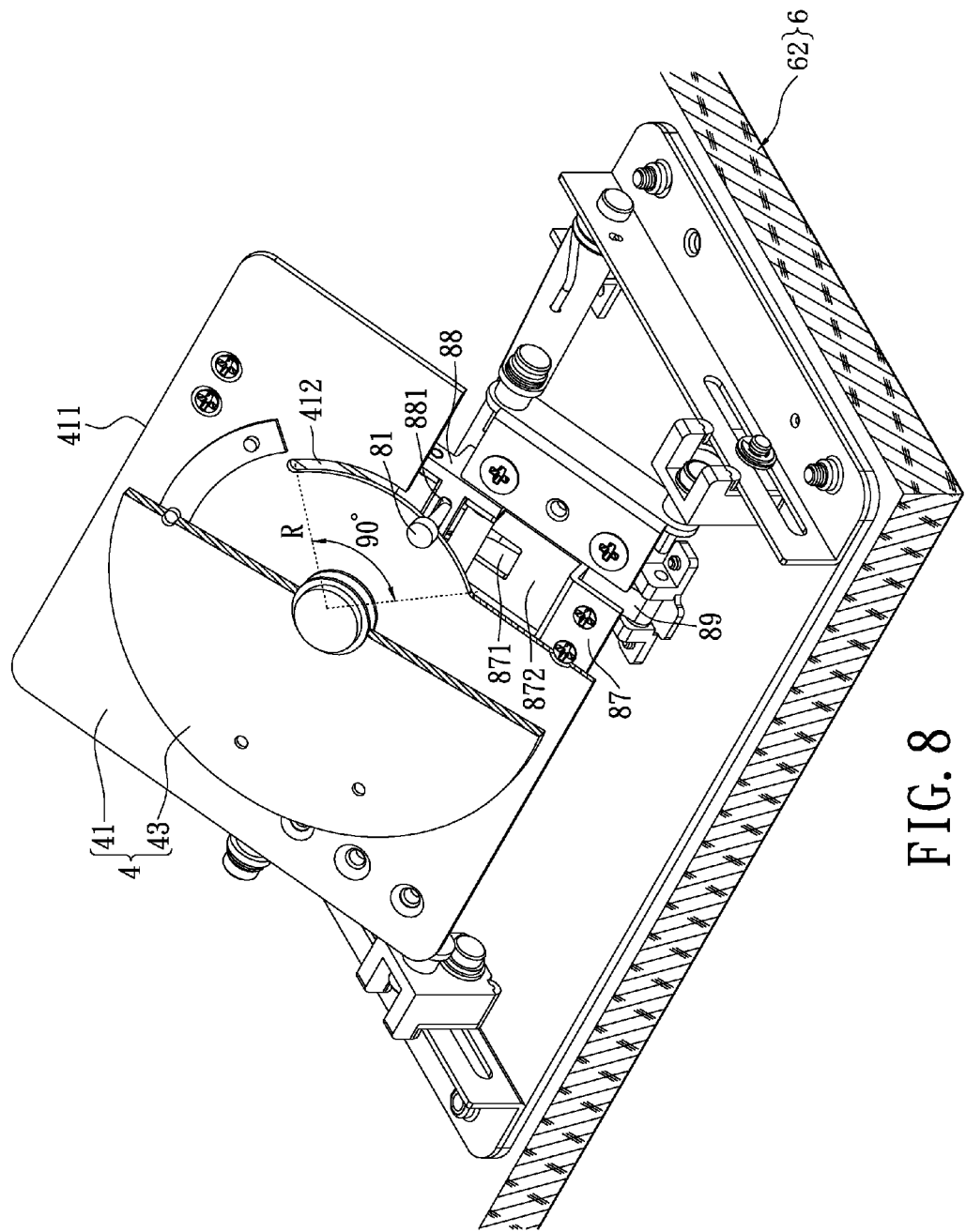
FIG. 8 is a partial exploded view of the monitor mounting apparatus in FIG. 7.

Please refer to FIG. 8. A hole is formed centrally on the support plate 41 of the tilt bracket 4, and a circular arc-shaped guide slot 412 is formed on the support plate 41 away from the hole. The radius of the arc is denoted by the alphabet "R", and the corresponding central angle is substantially 90° but is not restricted thereto.

Likewise, the support plate 41 has an outer end portion 411, where the angle-adjusting members 22 of the adjusting unit 2 are connected to one side portion of the support plate 41 away from the outer end portion 411.

Figure 9:
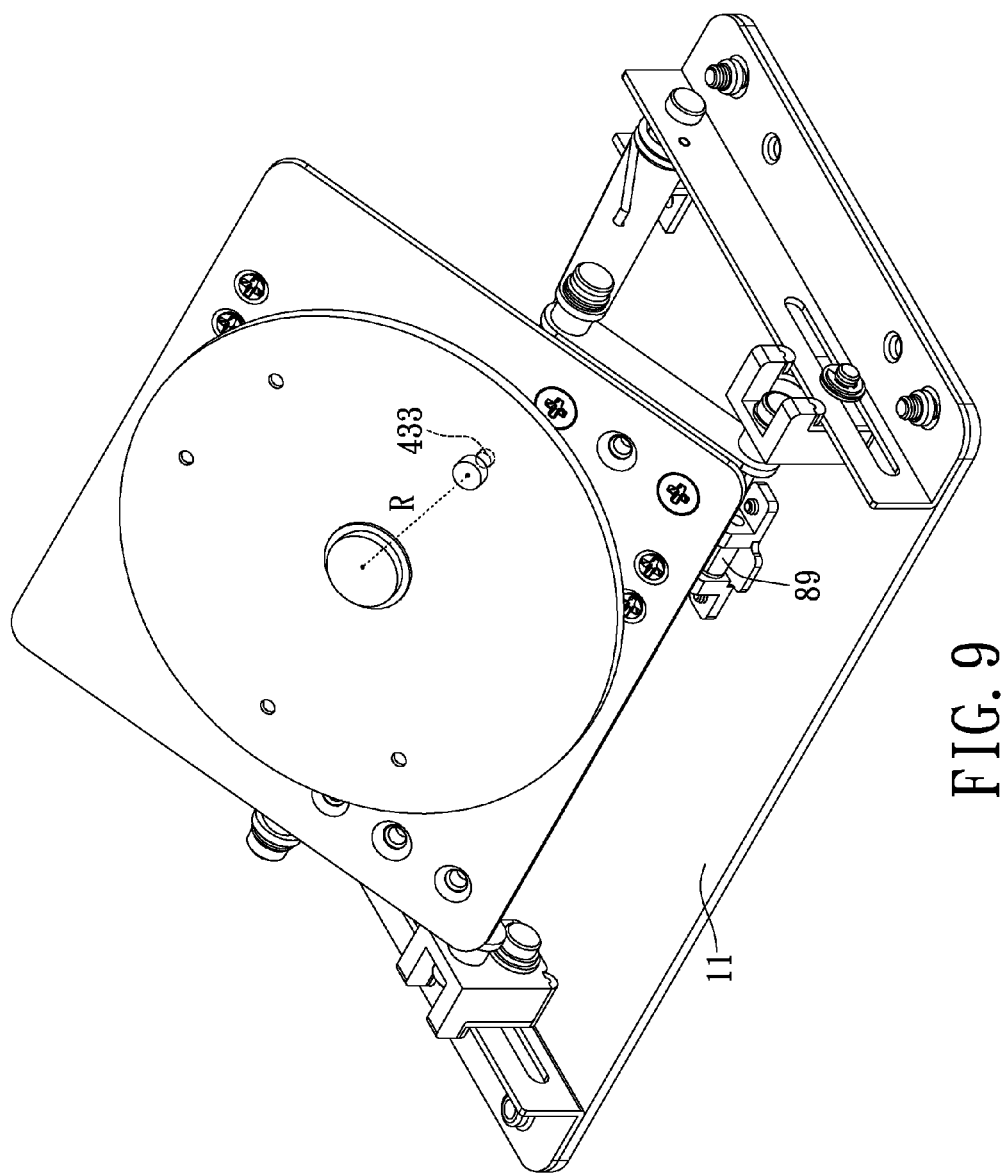
FIG. 9 is another perspective view of the monitor mounting apparatus in FIG. 7 taken from a different angle.

A circular hole is formed centrally on the turntable 43 of the tilt bracket 4. A via hole 433 is formed on the turntable 43 and having a distance "R" away from the center of the turntable 43 (as shown in FIG. 9). The diameter of the via hole 433 is substantially the same as the width of the guide slot 412. Furthermore, the display holder 44 of the tilt bracket 4 is fixed on the turntable 43, as show in FIG. 7.

Figure 10:
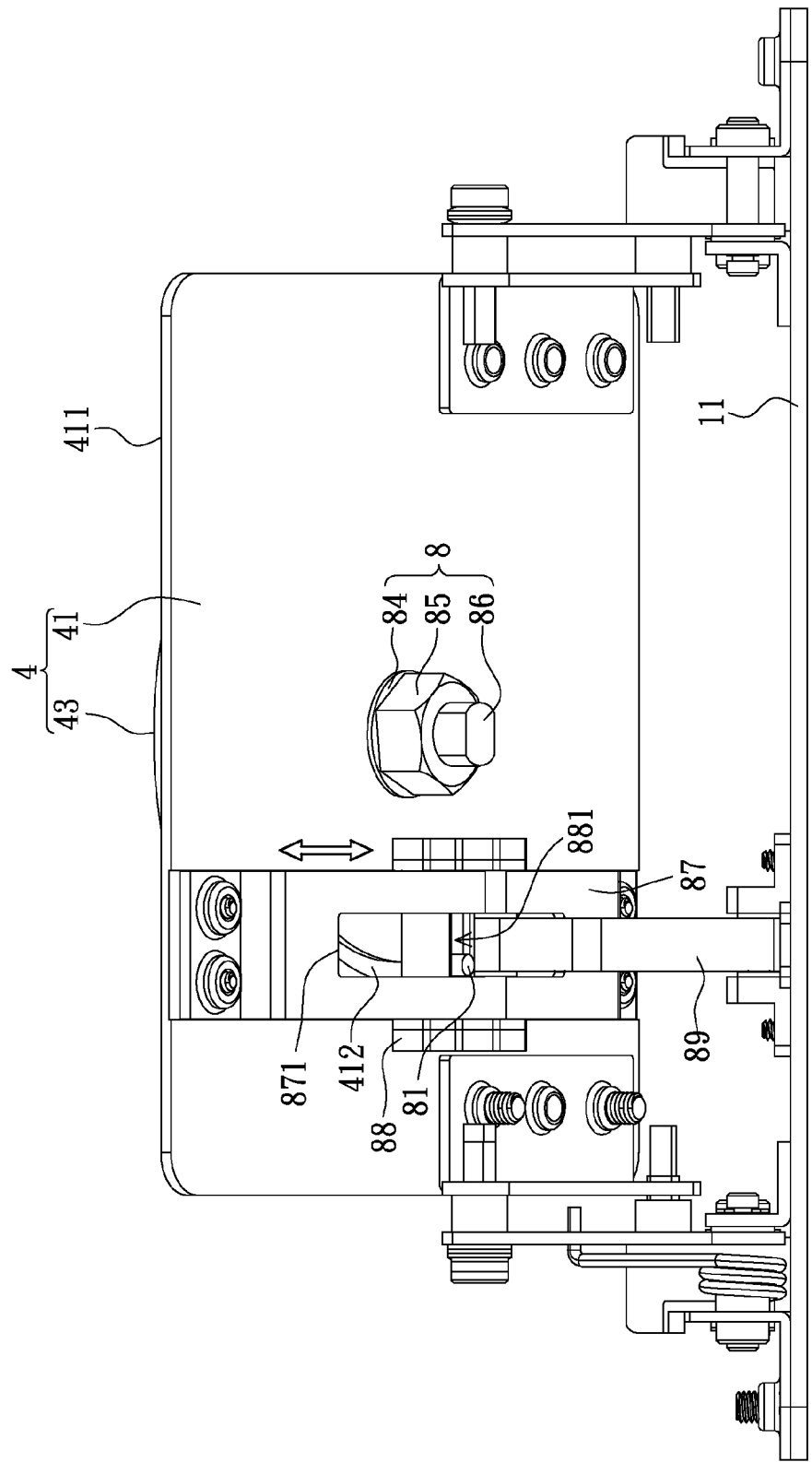
FIG. 10 is a plain view of the monitor mounting apparatus in FIG. 7.
Figure 11:
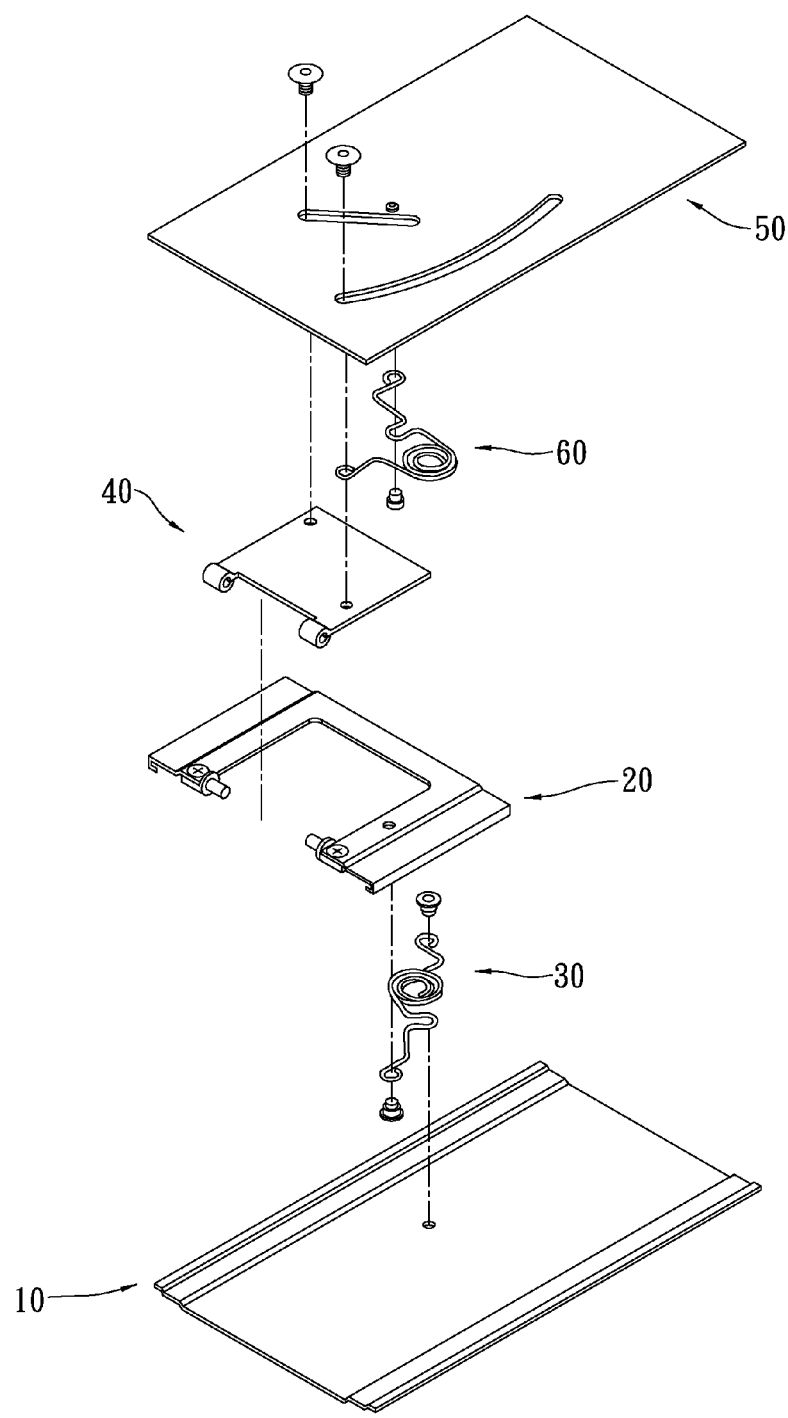
FIG. 11 is an exploded view of a conventional monitor mounting apparatus.

Please refer to FIGS. 8 and 10. The synchronizing mechanism 8 includes a set screw 86, a plurality of washers 84, a nut 85, a guide frame 87, a guide block 88, a connecting arm 89, and a traverser 81.

The set screw 86 has a non-cylindrical body with two flat surfaces oppositely formed thereon. The set screw 86 penetrates the circular hole of the turntable 43, the hole of the support plate 41, and the nut 85 sequentially. Thus, the turntable 43 and the display holder 44 may rotate relative to the support plate 41, and the turntable 43 may rotate axially relative to the support plate 41.

The cross-section of the guide frame 87 is substantially U-shaped, and an elongated via-slot 871 is formed centrally thereon. The guide frame 87 is fixed on the surface of the support plate 41 facing away the turntable 43 on both ends thereof. An intermediate space 872 is defined between the guide frame 87 and the support plate 41. The intermediate space 872 is in communication with the via-slot 871 and the guide slot 412, and the via-slot 871 is arranged substantially in proximity to the guide slot 412.

The guide block 88 may be movably arranged between the guide frame 87 and the support plate 41. The opposite ends of the guide block 88 are arranged adjacent to the outer edges of the guide frame 87 and extending beyond therefrom. Such configuration forces the guide block 88 to traverse in a direction along the guide frame 87 only (denoted by the arrow in FIG. 10). Moreover, an elongated thru-slot 881 is formed on the portion of the guide block 88 within the intermediate space 872. The thru-slot 881 projects in a direction substantially normal to the traversing direction of the guide block 88.

One end of the connecting arm 89 may be pivotally connected to the base plate 11 of the base 1. Whereas the other end of the connecting arm 89 is pivotally connected to the protruded end portions of the guide block 88 relative to the guide frame 87. The edge of the other end portion of the connecting arm 89 is movably received by the via-slot 871. One end of the traverser 81 penetrates the via-hole 433 of the turntable 43, the guide slot 412 of the support plate 41, and the thru-slot 881 of the guide block 88 in sequences.

As a whole, when the adjusting unit 2 adjusts the inclination of the tilt bracket 4, the connecting arm 89 is pivotally displaced. The pivotal displacement of the connecting arm 89 moves the guide block 88, making the traverser 81 to move within the guide slot 412. Thereby, the traverser 81 would force the turntable 43 and the display holder 44 to rotate. Since the central angle of the guide slot 412 is substantially 90°, the maximum allowable rotational range for the display holder 44 is substantially 90°. Thus, the monitor 7 on the display holder 44 may be adjusted to anywhere within the adjustment range defined by the horizontal position and the maximum allowable angular position.

In summary, the monitor mounting apparatus of the instant disclosure may be provided with the synchronizing mechanism 8, enabling the monitor 7 to be movably arranged on the tilt bracket 4. The modified synchronizing mechanism 8 can further self-rotate the monitor 7 when adjusting the inclination of the tilt bracket 4.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A monitor mounting apparatus, for disposing on a working surface, comprising:
   a base for disposing on the working surface having at least one first anchoring portion;
   an adjusting unit including at least one position-adjusting member and at least one angle-adjusting member in interconnection, wherein the position-adjusting member is movably disposed on the first anchoring portion;
   a tilt bracket including a support plate, a turntable having a via hole formed thereon, and a display holder fixedly arranged on the turntable, wherein the support plate has an outer end portion, and an arched guide slot is formed on the support plate, wherein the angle-adjusting member of the adjusting unit is connected to the support plate away from the outer end portion, wherein the turntable and the display holder are axially rotatable relative to the support plate; and
   a synchronizing mechanism having a guide frame, a guide block, a connecting arm, and a traverser, wherein the guide frame is fixed to the support plate, wherein the guide block is movably disposed between the guide frame and the support plate, wherein the guide block has a thru-slot formed thereon, wherein the connecting arm is pivotally connected to the base and the guide block on opposite ends thereof,
   wherein the traverser penetrates the via hole of the turntable and the guide slot of the support plate, wherein the traverser is movably penetrated through the thru-slot of the guide block and movable with respect to the base in the guide slot of the support plate,
   wherein the tilt bracket is movably arranged between and including a first operating position and a second operating position, and wherein the distance between the outer end portion and the working surface with the tilt bracket oriented at the first operating position is less than the distance therebetween when the tilt bracket is oriented at the second operating position.

2. The monitor mounting apparatus of claim 1, further comprising a synchronizing mechanism having a shaft, a toothed rack, and a gear, wherein the shaft penetrates the turntable, the guide slot of the support plate, and the gear, wherein the gear is turnable by the turntable through the shaft, and wherein the toothed rack is fixed on the support plate and engaged to the gear.

3. The monitor mounting apparatus of claim 1, wherein a stop is runningly protruded from an edge portion of the base away from the first anchoring portion, wherein the position-adjusting member of the adjusting unit further includes a traverse block, wherein the traverse block is fixed onto the position-adjusting member and is movable therewith, wherein an energy-storing device is arranged between one end of the traverse block and the stop, wherein the energy-storing device includes at least one tension spring set fixed to the stop and the traverse block on opposite ends thereof.

4. The monitor mounting apparatus of claim 1, wherein the guide slot is circular arc-shaped, with the radius of the arc being substantially the same as the distance between the via hole of the turntable and the center of the turntable, and wherein a central angle of 90° is formed for the guide slot.

5. The monitor mounting apparatus of claim 1, wherein an opening is formed on the first anchoring portion, and wherein the position-adjusting member has at least one slide pin movably disposed in the opening.

6. The monitor mounting apparatus of claim 1, wherein the base includes a base plate and at least one fixing plate disposed thereon, wherein the first anchoring portion is formed on one end of the fixing plate and a second anchoring portion is formed on an opposite end thereof, and wherein the angle-adjusting member is pivotally connected to the first anchoring portion.

7. The monitor mounting apparatus of claim 6, further comprising at least one tilt frame having at least one first end portion and at least one second end portion formed oppositely thereon, wherein the first end portion is pivotally connected to the second anchoring portion of the base and the second end portion is pivotally connected to the angle-adjusting member.

8. A monitor mounting apparatus, for disposing on a working surface, comprising:
   a base for disposing on the working surface having at least one first anchoring portion;
   an adjusting unit including at least one position-adjusting member and at least one angle-adjusting member in interconnection, wherein the position-adjusting member is movably disposed on the first anchoring portion; and
   a tilt bracket including a support plate, a turntable having a via hole formed thereon, and a display holder fixedly arranged on the turntable, wherein the support plate has an outer end portion, and an arched guide slot is formed on the support plate, wherein the angle-adjusting member of the adjusting unit is connected to the support plate away from the outer end portion, wherein the turntable and the display holder are axially rotatable relative to the support plate;
   a synchronizing mechanism having a traverser, wherein the traverser penetrates the via hole of the turntable and the guide slot of the support plate, wherein the traverser is movable with respect to the base in the guide slot to cause the turntable and the display holder to rotate, wherein the guide slot is circular arc-shaped, with the radius of the arc being substantially the same as the distance between the via hole of the turntable and the center of the turntable, and wherein a central angle of 90° is formed for the guide slot, wherein the tilt bracket is movably arranged between and including a first operating position and a second operating position, and wherein the distance between the outer end portion and the working surface with the tilt bracket oriented at the first operating position is less than the distance therebetween when the tilt bracket is oriented at the second operating position.

9. The monitor mounting apparatus of claim 8, wherein an opening is formed on the first anchoring portion, and wherein the position-adjusting member has at least one slide pin movably disposed in the opening.

10. The monitor mounting apparatus of claim 8, wherein the base includes a base plate and at least one fixing plate disposed thereon, wherein the first anchoring portion is formed on one end of the fixing plate and a second anchoring portion is formed on an opposite end thereof, and wherein the angle-adjusting member is pivotally connected to the first anchoring portion.

11. The monitor mounting apparatus of claim 9, further comprising at least one tilt frame having at least one first end portion and at least one second end portion formed oppositely thereon, wherein the first end portion is pivotally connected to the second anchoring portion of the base and the second end portion is pivotally connected to the angle-adjusting member.

* * * * *